(12) United States Patent
Choi et al.

(10) Patent No.: US 8,526,483 B2
(45) Date of Patent: Sep. 3, 2013

(54) POWER LINE CHANNEL-ADAPTIVE COMMUNICATIONS SYSTEM AND METHOD

(75) Inventors: Sung Soo Choi, Yongin-si (KR); Won Tae Lee, Seongnam-si (KR); Young Sun Kim, Suwon-si (KR); Yong Hwa Kim, Seoul (KR); Woo Bong Byun, Seongnam-si (KR)

(73) Assignee: Korea Electrotechnology Research Institute, Changwon (KR)

( * ) Notice: Subject to any disclaimer, the term of this patent is extended or adjusted under 35 U.S.C. 154(b) by 1030 days.

(21) Appl. No.: 12/547,164

(22) Filed: Aug. 25, 2009

(65) Prior Publication Data

US 2010/0054348 A1    Mar. 4, 2010

(30) Foreign Application Priority Data

Aug. 28, 2008    (KR) .................. 10-2008-0084475

(51) Int. Cl.
*H04B 1/00* (2006.01)

(52) U.S. Cl.
USPC ........... 375/139; 375/257; 375/260; 375/288; 375/295; 375/316

(58) Field of Classification Search
USPC ......... 375/139, 288, 130, 219, 220, 257–260, 375/285–286, 295, 316, 340, 343, 346
See application file for complete search history.

(56) References Cited

U.S. PATENT DOCUMENTS

| 6,671,311 B1* | 12/2003 | Raphaeli et al. ............. 375/142 |
| 2003/0133495 A1* | 7/2003 | Lerner et al. ................. 375/139 |

FOREIGN PATENT DOCUMENTS

| JP | 09-023174 | 1/1997 |
| JP | 2003-338778 | 11/2003 |
| KR | 1020050049508 A | 5/2005 |
| KR | 1020090053252 A | 5/2009 |

OTHER PUBLICATIONS

Sungsoo Choi, et al. SoC Design of a Dual-Mode Transceiver for Power-Line Telecommunications p. 467 2009 Fifth Advanced International Conference on Telecommunications.

* cited by examiner

*Primary Examiner* — Sam K Ahn
*Assistant Examiner* — James M Perez (57) ABSTRACT

Disclosed herein is a power line channel-adaptive communications system and method. The power line channel-adaptive communications system includes a transmitting end, a channel-adaptive controller, and a receiving end. The transmitting end generates an adaptive chirp symbol signal of a preset type for transmission data according to a channel state of the power line, modulates the generated adaptive chirp symbol signal in any one of first and second transmission modes, and transmits the modulated adaptive chirp symbol signal via the power line channel. The channel-adaptive controller controls the type and transmission mode of the adaptive chirp symbol signal. The receiving end restores the transmission data by demodulating the adaptive chirp symbol signal, received via the power line channel, in any one of the first and second transmission modes according to the channel state of the power line.

15 Claims, 5 Drawing Sheets

POWER LINE CHANNEL-ADAPTIVE COMMUNICATIONS SYSTEM AND METHOD

BACKGROUND OF THE INVENTION

1. Field of the Invention

The present invention relates to a power line channel-adaptive communications system and method.

2. Description of the Related Art

In general, the characteristics of a power line channel are greatly influenced by not only signal attenuation depending on the distance, but noise generated by indoor electrical appliances, information household appliances and office equipment. In particular, it can be said that a power line channel has a poor channel state in a low frequency band as compared with that in other frequency bands.

Since a chirp band spread modulation and demodulation technology has the characteristic of the linear time-frequency modulation of transmission signals, it provides stable communication performance despite noise occurring in the power line and variation in the channel impedance. In the transmission of a chirp band spread signal, when a transmission symbol signal is extended using the frequency linearity of the transmission symbol signal, the data transmission rate can be further increased, and a synchronization unit capable of more easily obtaining the data of received signals can be implemented.

However, since high-load electrical equipment with a larger noise source is coupled to a power line network, the SNR of the received signal level against the noise level in the power line is subject to sharp decreases, so that there may be a problem with communication connectivity or communication reliability. For this reason, reliable data cannot be transmitted using only the chirp band spread method, so that there is a need for an additional scheme capable of compensating for the problem because.

SUMMARY OF THE INVENTION

Accordingly, the present invention has been made keeping in mind the above problems occurring in the prior art, and an object of the present invention is to provide a power line channel-adaptive communications system and method which is capable of actively dealing with variation in the channel by changing the time and frequency characteristics of transmission signals according to the channel state of a power line.

Another object of the present invention is to provide a power line channel-adaptive communications system and method which is capable of efficiently transmitting data by supporting a dual transmission mode according to the channel state of a power line.

In order to achieve the above objects, the present invention provides a power line channel-adaptive communications system, including a transmitting end for generating an extended adaptive chirp symbol signal of a preset type for transmission data according to a channel state of the power line, modulating the generated adaptive chirp symbol signal in any one of first and second transmission modes, and transmitting the modulated adaptive chirp symbol signal via the power line channel; a channel-adaptive controller for controlling the type and transmission mode of the adaptive chirp symbol signal; and a receiving end for restoring the transmission data by demodulating the adaptive chirp symbol signal, received via the power line channel, in any one of the first and second transmission modes according to the channel state of the power line.

Preferably, the transmitting end includes a Forward. Error Correction (FEC) encoder for encoding the transmission data so that errors of the transmission data can be detected and corrected; a Serial-to-Parallel (S/P) converter for converting the FEE-encoded data into parallel data; an adaptive symbol mapper for generating the extended adaptive chirp symbol signal of the preset type according to the channel state of the power line based on the parallel data; a dual transmission mode signal modulator for modulating the generated adaptive chirp symbol signal in any one of the first and second transmission modes according to the channel state of the power line; a Digital-to-Analog (D/A) converter for converting the modulated adaptive chirp symbol signal into an analog signal; a Band Pass Filter (BPF) for filtering the analog signal; and an amplifier for amplifying the filtered analog signal and transmitting the amplified signal via the power line channel through a signal coupler.

Preferably, the adaptive symbol mapper generates the extended adaptive chirp symbol signal of the preset type by changing time and frequency characteristics of the extended adaptive chirp symbol signal according to the channel state of the power line.

Preferably, the channel-adaptive controller provides the adaptive symbol mapper with a signal for controlling the type of the adaptive chirp symbol signal based on a state value of the power line channel, and provides the dual transmission mode modulation unit with a signal for controlling any one of the first and second transmission modes.

Preferably, the receiving end includes a pre-filter for pre-filtering the signal received from the power line channel through a signal coupler; a pre-amplifier for amplifying the pre-filtered signal; a channel filter for performing channel filtering on the signal amplified by the pre-amplifier; an Analog-to-Digital (A/D) converter for converting the channel-filtered signal into a digital signal; a dual transmission mode signal demodulator for demodulating the digital signal in any one of the first and second transmission modes; and an FEC decoder for restoring the transmission data by decoding the demodulated signal.

Preferably, the receiving end further includes a Zero-Crossing Point (ZCP) detector for acquiring reception synchronization from the signal received from the power line channel; a synchronization unit for adjusting reception synchronization of the receiving end based on the acquired reception synchronization, and transferring the adjusted reception synchronization to the channel-adaptive controller; and a channel variation measurer for measuring a state value of the power line channel based on a signal output from the A/D converter, and transferring the measured state value of the power line channel to the channel-adaptive controller.

According to another aspect of the present invention, there is provided a power line channel-adaptive communications method, including the steps of generating an adaptive chirp symbol signal of a preset type for transmission data according to a channel state of the power line, modulating the generated adaptive chirp symbol signal in any one of first and second transmission modes, and transmitting the modulated adaptive chirp symbol signal via the power line channel; controlling the type and transmission mode of the adaptive chirp symbol signal; and receiving the adaptive chirp symbol signal via the power line channel and restoring the transmission data by demodulating the received signal in any one of the first and second transmission modes according to the channel state of the power line.

Preferably, the step of transmitting the modulated adaptive chirp symbol signal includes the steps of FEC-encoding the transmission data so that errors of the transmission data can be detected and corrected; converting the FEC-encoded data into parallel data; generating the adaptive chirp symbol signal of the preset type according to the channel state of the power line based on the parallel data; modulating the generated adaptive chirp symbol signal of the preset type in any one of the first and second transmission modes according to the channel state of the power line; converting the modulated signal into an analog signal; performing bandpass filtering on the analog signal; and amplifying the bandpass-filtered signal, and transmitting the amplified signal via the power line channel through a signal coupler.

Preferably, the step of generating the adaptive chirp symbol signal of the preset type includes the step of generating the extended adaptive chirp symbol signal of the preset type by changing time and frequency characteristics of the extended adaptive chirp symbol signal according to the channel state of the power line.

Preferably, the step of controlling the type and transmission mode of the adaptive chirp symbol signal includes the steps of providing a signal for controlling the type of the adaptive chirp symbol signal based on a state value of the power line channel, and providing a signal for controlling any one of the first and second transmission modes.

Preferably, the step of receiving the adaptive chirp symbol signal includes the steps of pre-filtering the adaptive chirp symbol signal received via the power line channel through a signal coupler; pre-amplifying the pre-filtered signal; performing channel filtering on the pre-amplified signal; converting the channel-filtered signal into a digital signal; demodulating the digital signal in any one of the first and second transmission modes; and restoring the transmission data by decoding the demodulated signal.

Preferably, the power line channel-adaptive communications method further includes the steps of acquiring reception synchronization from the signal received from the power line channel; adjusting reception synchronization of a receiving end based on the acquired reception synchronization, and transferring the adjusted reception synchronization to a transmitting end; and measuring a state value of the power line channel based on the digital signal into which the signal received via the power line channel has been converted, and transferring the measured state value of the power line channel to the transmitting end.

Preferably, the first transmission mode is an RM, and the second transmission mode is a ZERM.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Embodiments of the present invention will be described in detail with reference to the accompanying drawings.

A power line channel-adaptive communications system and method according to embodiments of the present invention is described in detail below with reference to FIGS. 1 to 7.

The present invention proposes a power line channel-adaptive communications system having a transmission and reception structure which can change the time and frequency characteristics of a transmission signal according to the channel state of the power line or can support a dual transmission mode so that data can be transmitted without interruption despite variation in the load and external noise generated by various indoor electrical appliances, information household appliances and office equipment.

Figure 1:
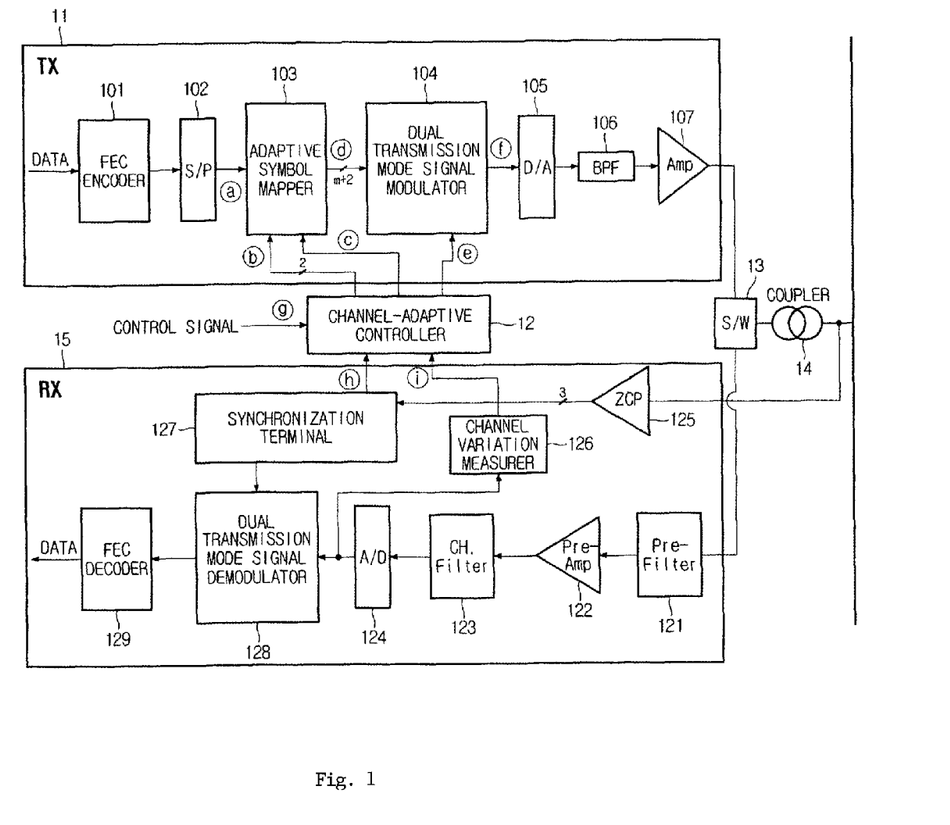
FIG. 1 is a diagram schematically showing an example of the construction of a communications system according to an embodiment of the present invention.

FIG. 1 is a diagram schematically showing an example of the construction of a communications system according to an embodiment of the present invention.

As shown in FIG. 1, the communications system according to the present invention may include a transmitting end (TX) 11, a channel-adaptive controller 12, a switch 13, a signal coupler 14, and a receiving end (RX) 15.

The transmitting end 11 may include a Forward Error Correction (FEC) encoder 101, a Serial-to-Parallel (S/P) converter 102, an adaptive symbol mapper 103, a dual transmission mode signal modulator 104, a Digital-to-Analog (D/A) converter 105, a Band Pass Filter (BPF) 106, and an amplifier 107.

The operating principle of the transmitting end 11 is summarized below. The FEC encoder 101 can encode transmission data so that errors of the data which may occur in a power line channel can be detected and corrected. The S/P converter 102 can convert the data into n-bit parallel data.

The adaptive symbol mapper 103 can generate an adaptive chirp symbol based on the resulting parallel data. Such an adaptive chirp symbol or an adaptive chirp symbol signal has an up-chirp and down-chirp form, and the symbol of a transmission signal can be expressed using the following Equation (1):

$$\psi_{chirp}(t) = \sqrt{\frac{2E}{T_S}} e^{2\pi j \left(f_1 \pm \frac{f_{BW}}{T_S} t\right)t} \cdot p(t) \quad (1)$$

where E is the symbol energy of a transmission signal, $f_1$ is the start frequency of a chirp spread signal, $f_{BW}$ is the frequency band of a signal, $T_s$ is the duration of a chirp signal, and p(t) is a rectangular window having 1 within the duration $T_S$. The chirp symbols can be distinguished from each other by a Linear Feedback Shift Register (LFSR) while they move at time intervals $T_S$. A general term of extended chirp symbol can be expressed using the Equation (2):

$$\psi_i(t) = \sqrt{\frac{2E}{T_S}} \, e^{2\pi j f_i t} \cdot p(t), \quad (2)$$

$$p(t) = \begin{cases} 1, & \text{for } 0 < t < T_S \\ 0, & \text{otherwise,} \end{cases}$$

$$0 \le i < N$$

where $f_i$ refers to the frequency value of an i-th adaptive chirp symbol signal, and can be expressed using the following Equation (3):

$$f_i = \begin{cases} f_1 + a_i \dfrac{f_{BW}}{T_S}(t + i \cdot T_1), & \text{for } 0 \le t < T_S - i \cdot T_1 \\ f_1 + b_i \dfrac{f_{BW}}{T_S}(t + i \cdot T_1 - T_S), & \text{for } T_S - i \cdot T_1 \le t < T_S \\ a_i, b_i = \begin{cases} 1 \\ -1, \end{cases} & \text{for } i = 0, 1, 2, \ldots N-1 \end{cases} \quad (3)$$

where $f_i$ is the number of shifts, $a_i$ and $b_i$ are parameters representing the time and frequency characteristics of an i-th adaptive chirp symbol signal, and $T_1$ is the duration of a minimum unit shift.

After a chirp symbol is determined, a transmission signal can be defined. This can be expressed using the following Equation (4):

$$s(t) = \sum_{m=\lfloor 0,1 \rfloor}^{\infty} s_m(t) \cdot \omega(t) \quad (4)$$

where m is a transmission mode, 0 is a Robust. Mode (RM) (i.e., a first transmission mode), 1 is a Zero-crossing Robust: Mode (ZERM) (i.e., a second transmission mode), and $\omega(t)$ is a channel window function. The first and second transmission modes can be expressed using the following Equations (5) and (6), respectively:

$$s_{RM}(t) = \sum_{k=0}^{L-1} \psi_i(t - k \cdot T_S), \quad 0 \le i < N \quad (5)$$

$$s_{ZERM}(t) = \sum_{k=0}^{L-1} \sum_{l=0}^{M-1} \psi_i\!\left(t - k \cdot T_s - l \cdot \frac{T_{AC}}{2}\right), \quad 0 \le i < N \quad (6)$$

where $T_{AC}$ is a time interval between zero-crossing points of the AC frequency of a power line, L is the number of maximum symbols in the first transmission mode, and M is the number of maximum symbols in the second transmission mode.

Figure 2:
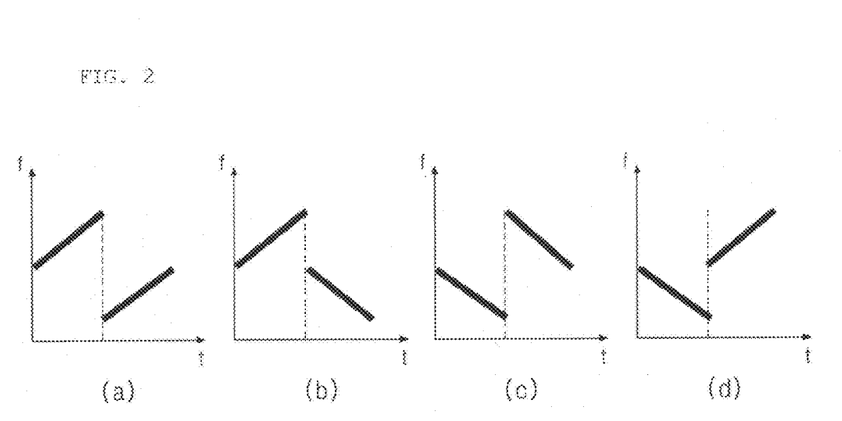
FIG. 2 is a diagram showing a first example of the waveforms of chirp signals according to an embodiment of the present invention.
Figure 3:
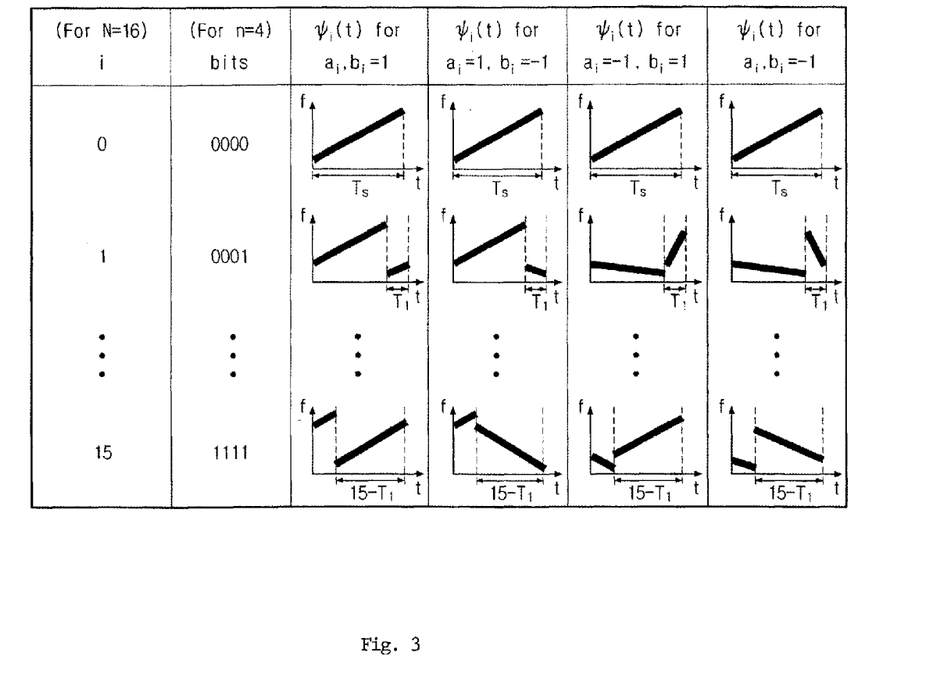
FIG. 3 is a diagram showing a second example of the waveforms of extended chirp signals according to an embodiment of the present invention.

FIG. 2 is a frequency-time characteristic diagram showing a first example of the waveforms of chirp signals according to an embodiment of the present invention, and FIG. 3 is a diagram showing a second example of the waveforms of extended chirp signals according to an embodiment of the present invention.

As shown in FIG. 2, a basic chirp signal can be extended into the pattern of an adaptive chirp symbol. The basic chirp symbol may be expressed using any one of the 4N chirp signal waveforms (a) $a_i=1$, $b_i=1$, (b) $a_i=1$, (c) $b_i=-1$, and (d) $b_i=1$ which can be generated and combined using − and + signs according to Equation 3. The used chirp symbols can be distinguished from each other by a Linear Feedback Shift Register (LFSR) while they move at time intervals $T_i$.

As shown in FIG. 3, the patterns of adaptive chirp symbols may be expressed using $2^n$ types of chirp signal waveforms on an n-bit basis. For example, if data is bundled on a 4-bit basis, bit patterns may be expressed using 0000 to 1111 types, that is, $16(=2^4)$.

Referring back to FIG. 1, the dual transmission mode signal modulator 104 may generate a signal in a dual transmission mode, that is, a signal in any one of first and second transmission modes, based on the generated adaptive chirp symbol. Here, the first transmission mode may be an RM, and the second transmission mode may be a ZERM.

The D/A converter 105 may convert the digital signal, output from the dual transmission mode signal modulator 104, into an analog signal. The BPF 106 may filter the resulting analog signal in order to transmit only a signal at a corresponding frequency. The amplifier 107 may amplify the signal output from the BPF 106. Thus, the transmitting end 11 can transmit the amplified signal via the power line channel through the signal coupler 14 for coupling transmission and reception signals.

The receiving end 15 may include a pre-filter 121, a pre-amplifier 122, a channel filter 123, an Analog-to-Digital (A/D) converter 124, a Zero-Crossing Point (ZCP) detector 125, a channel variation measurer 126, a synchronization unit 127, a dual transmission mode signal demodulator 128, and an FEC decoder 129.

The operating principle of the receiving end 15 is summarized below. The receiving end 15 may receive a signal via the power line channel through the signal coupler 14 for coupling transmission and reception signals. The pre-filter 121 may filter the received signal. The pre-amplifier 122 may amplify the pre-filtered signal. The channel filter 123 may perform channel filtering on the amplified signal. The A/D converter 124 may obtain a reception sample by converting the analog signal, output from the channel filter 123, into a digital signal.

Here, the receiving end 15 may adjust reception synchronization through the ZCP detector 125, and may transfer a state value of the power line channel to the channel-adaptive controller 12 through the channel variation measurer 126. The channel-adaptive controller 12 may receive the resulting value of the channel variation measurer 126 and a control signal for dual transmission mode, and transfer a signal for transmission mode switching to the adaptive symbol mapper 103 and the dual transmission mode signal modulator 104 of the transmitting end 11, thereby being capable of changing the type and transmission mode of an adaptive symbol.

Consequently, the receiving end 15 adjusts the reception synchronization of the digital signal output from the A/D converter 124, thereby obtaining transmission data through the dual transmission mode signal demodulator 128 and the FEC decoder 129.

As described above, the present invention can actively deal with variation in the channel by changing the time and frequency characteristics of a transmission signal (i.e., the pattern of an adaptive chirp symbol) according to the channel state of a power line. Furthermore, the present invention can efficiently send data by supporting the dual transmission mode (i.e., the first and second transmission modes) according to the channel state of a power line.

Figure 4:
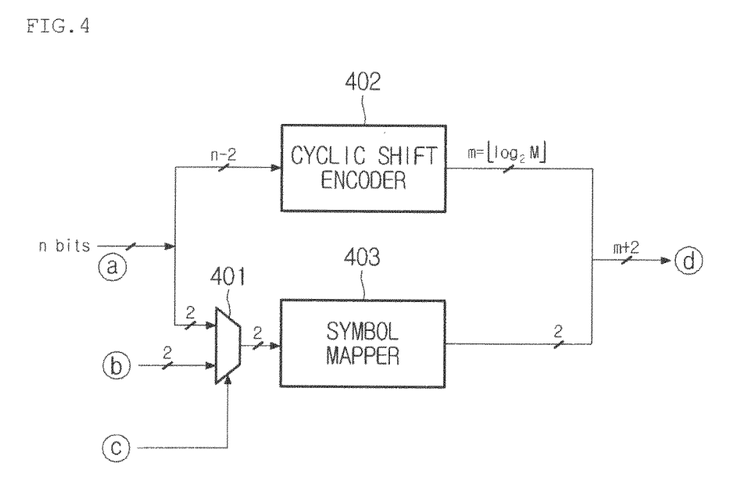
FIG. 4 is a diagram schematically showing an example of the detailed construction of an adaptive symbol mapper shown in FIG. 1.

FIG. 4 is a diagram schematically showing an example of the detailed construction of the adaptive symbol mapper 103 shown in FIG. 1.

As shown in FIG. 4, the adaptive symbol mapper 103 according to the present invention may include a multiplexer 401, a cyclic shift encoder 402, and a symbol mapper 403.

The operating principle of the adaptive symbol mapper is described below. Assuming that 'n' is, for example, 4 bits, the input of the cyclic shift encoder 402 may be 2 bits. In this case, the maximum number of shifts M is 4 ($=2^2$), and the output m of the cyclic shift encoder 402 can be obtained through "$\lfloor \log_2 M \rfloor$". The multiplexer 401 may have two inputs ⓐ and ⓑ each having 2 bits, and output one of the two inputs ⓐ and ⓑ as its output in response to a control signal ⓒ. Since the total number of bit strings that can be expressed in 2 bits by the symbol mapper 403 are four, it can be seen that the bit strings are changed into four types of chirp symbols. The output value of the symbol mapper 403 and the output value of the cyclic shift encoder 402 can be combined and output as the output ⓓ of the adaptive symbol mapper.

Figure 5:
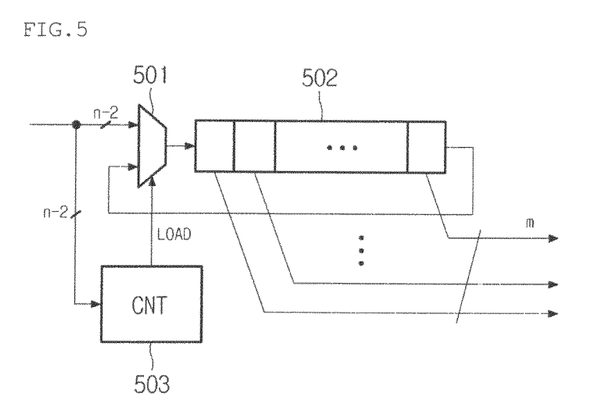
FIG. 5 is a diagram schematically showing an example of the detailed construction of a cyclic shift encoder shown in FIG. 4.

FIG. 5 is a diagram schematically showing an example of the detailed construction of the cyclic shift encoder 402 shown in FIG. 4.

As shown in FIG. 5, the cyclic shift encoder 402 according to the present invention may include a multiplexer 501, shift registers 502, and a counter CNT 503. The input values of the cyclic shift encoder 402 may be sequentially stored in the shift registers 502, which are then fully filled with the values. While the stored values are shifted, they can be output as the output values m of the cyclic shift encoder 502. Furthermore, when a load signal Load from the counter CNT 503 is input to the multiplexer 501, new data (i.e., input values) may be sequentially input to the shift registers 502. Parameters used herein are defined in Table 1.

TABLE 1

| m | M | $f_n$ |
|---|---|---|
| $(a_0 a_1, \ldots, a_{m-1})$ | 0 | None |
| . | 1 | 1 time shift |
| . | 2 | 2 times shift |
| . | . | . |
| . | . | . |
| . | M − 1 | (M − 1) times shift |

Here, 'm' may be a data bit string, 'M' may be the maximum number of times shift can be performed, and $f_n$ may be the number of shifts. That is, the cyclic shift encoder may refer to $f_n$.

Figure 6:
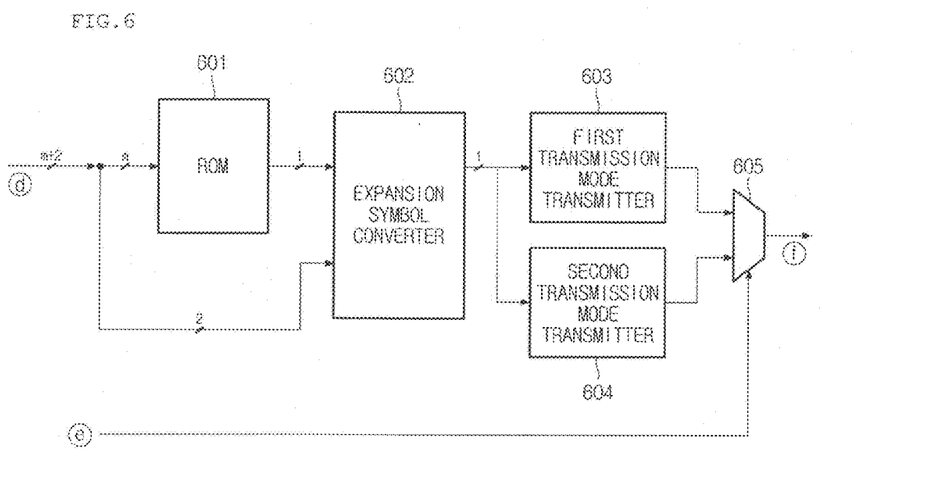
FIG. 6 is a diagram schematically showing an example of the detailed construction of a dual transmission mode signal modulator shown in FIG. 1.

FIG. 6 is a diagram schematically showing an example of the detailed construction of the dual transmission mode signal modulator 104 shown in FIG. 1.

As shown in FIG. 6, the dual transmission mode signal modulator 104 according to the present invention may include Read Only Memory (ROM) 601, an expansion symbol converter 602, a first transmission mode transmitter 603, a second transmission mode transmitter 604, and a multiplexer 605.

The dual transmission mode signal modulator 104 may receive the output values ⓓ of the adaptive symbol mapper 103. Of such values, 'm' is input to the ROM 601. A chirp pattern for a corresponding bit string can be output as a value of 1. The value of 1 and the 2 bits of the input value are again input to the expansion symbol converter 602. The expansion symbol converter 602 may generate values which will be sent to the first transmission mode transmitter 603 and the second transmission mode transmitter 604. The multiplexer 605 may select one of the first and second transmission modes in response to a control signal ⓔ output from the channel-adaptive controller 12, and output the selected, transmission mode ⓕ.

Figure 7:
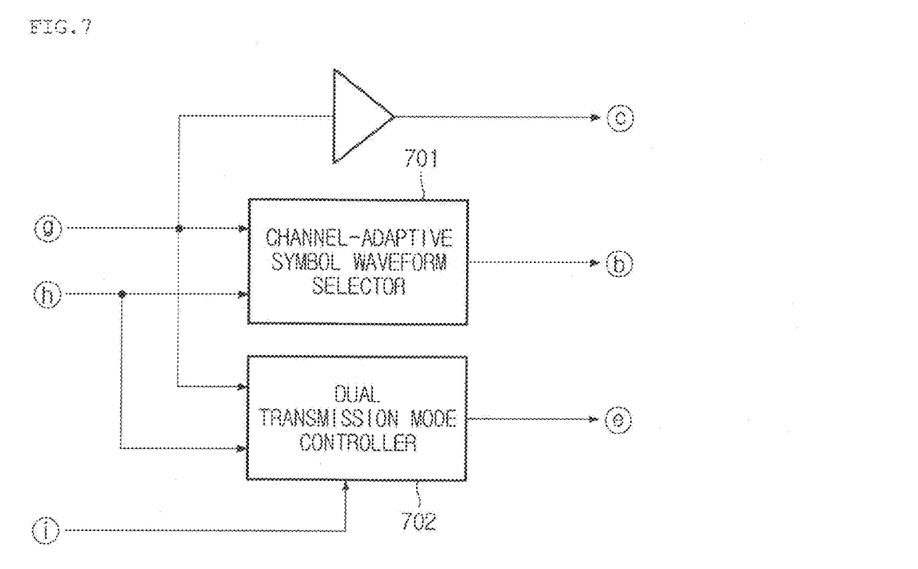
FIG. 7 is a diagram schematically showing an example of the detailed construction of a channel-adaptive controller shown in FIG. 1.

FIG. 7 is a diagram schematically showing an example of the detailed construction of the channel-adaptive controller 12 shown in FIG. 1.

As shown in FIG. 7, the channel-adaptive controller 12 according to the present invention may include a channel-adaptive symbol waveform selector 701 and a dual transmission mode controller 702.

The channel-adaptive controller chiefly performs the following functions. First, it can improve the transmission data rate. That is, assuming that 'm' is $a_2 a_3 \ldots a_{n-2}$, in the case of an expansion type, the channel-adaptive controller can send additional 2 bits for one symbol waveform because it sends a signal ⓒ with $a_0 a_1$ added to the signal. Second, a symbol waveform can be selected so that variation in the channel can be actively dealt with in response to a reference signal ⓗ and a signal ⓖ received from an upper layer, and the selected symbol waveform can be output as a signal ⓑ. Third, a dual transmission mode signal can be generated. That is, when the reception S/N ratio is very low due to external noise, a flag for sending the symbol waveform 13 generated near a zero-crossing point in response to a signal ⓘ received through the ZCP detector, and then a signal ⓔ can be transferred to the dual transmission mode signal modulator 104 so that it can be output to the second transmission mode transmitter 604.

The functions Used in the method disclosed in the present invention may be implemented in the form of computer-readable codes in a computer-readable recording medium. The computer-readable recording medium may include all types of recording devices in which data readable by a computer system is stored. The computer-readable recording medium may include, or example, ROM, RAM, CD-ROM, magnetic tapes, a floppy disk and optical data storage, and it may also be implemented in the form of carrier waves (e.g., in the case of transmission over the Internet). Furthermore, codes which are distributed among computer systems connected over a network and which are readable by computers in a distributed manner may be stored and executed in the computer-readable recording medium.

Although some embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power line channel-adaptive communications system, comprising:

a transmitting end for generating an extended adaptive chirp symbol signal of a preset type for transmission data according to a channel state of the power line, modulating the generated adaptive chirp symbol signal in one of first and second transmission modes, and transmitting the modulated adaptive chirp symbol signal via the power line channel;

a channel-adaptive controller for controlling the type of the adaptive chirp symbol signal; and a receiving end for restoring the transmission data by demodulating the adaptive chirp symbol signal, received via the power line channel, in the one of the first and second transmission modes, wherein the one of the first and second transmission modes is selected by the channel-adaptive controller according to the channel state of the power line, and wherein the transmitting end comprises:

a Forward Error Correction (FEC) encoder for encoding the transmission data so that errors of the transmission data can be detected and corrected;
a Serial-to-Parallel (S/P) converter for converting the FEC-encoded data into parallel data;
an adaptive symbol mapper for generating the extended adaptive chirp symbol signal of the preset type according to the channel state of the power line based on the parallel data;
a dual transmission mode signal modulator for modulating the generated adaptive chirp symbol signal in the one of the first and second transmission modes according to the channel state of the power line;
a Digital-to-Analog (D/A) converter for converting the modulated adaptive chirp symbol signal into an analog signal;
a Band Pass Filter (BPF) for filtering the analog signal; and
an amplifier for amplifying the filtered analog signal and transmitting the amplified signal via the power line channel through a signal coupler.

2. The power line channel-adaptive communications system according to claim 1, wherein the adaptive symbol mapper generates the extended adaptive chirp symbol signal of the preset type by changing time and frequency characteristics of the extended adaptive chirp symbol signal according to the channel state of the power line.

3. The power line channel-adaptive communications system according to claim 2, wherein a general term of the adaptive chirp symbol signal is expressed using the following Equation (2):

$$\psi_i(t) = \sqrt{\frac{2E}{T_S}} \, e^{2\pi j f_i t} \cdot p(t), \qquad (2)$$

$$p(t) = \begin{cases} 1, & \text{for } 0 \le t \le T_S \\ 0, & \text{otherwise,} \end{cases}$$

$$0 \le i < N$$

where E refers to a symbol energy, and $T_s$ is a chirp signal duration, $f_i$ refers to the frequency value of an i-th adaptive chirp symbol signal, and can be expressed using the following Equation (3):

$$f_i = \begin{cases} f_1 + a_i \dfrac{f_{BW}}{T_S}(t + i \cdot T_1), & \text{for } 0 \le t < T_S - i \cdot T_1 \\ f_1 + b_i \dfrac{f_{BW}}{T_S}(t + i \cdot T_1 - T_S), & \text{for } T_S - i \cdot T_1 \le t < T_S \\ a_i, b_i = \begin{cases} 1 \\ -1, \end{cases} & \text{for } i = 0, 1, 2, \ldots N-1 \end{cases} \qquad (3)$$

where i is a number of shifts, $a_i$ and $b_i$ are parameters representing the time and frequency characteristics of an i-th adaptive chirp symbol signal, $f_{BW}$ is a frequency band, and $T_1$ is a duration of a minimum unit shift.

4. The power line channel-adaptive communications system according to claim 1, wherein the channel-adaptive controller provides the adaptive symbol mapper with a signal for controlling the type of the adaptive chirp symbol signal based on a state value of the power line channel, and provides the dual transmission mode modulation unit with a signal for controlling the one of the first and second transmission modes.

5. The power line channel-adaptive communications system according to claim 1, wherein the receiving end comprises:
a pre-filter for pre-filtering the signal received from the power line channel through a signal coupler;
a pre-amplifier for amplifying the pre-filtered signal;
a channel filter for performing channel filtering on the signal amplified by the pre-amplifier;
an Analog-to-Digital (A/D) converter for converting the channel-filtered signal into a digital signal;
a dual transmission mode signal demodulator for demodulating the digital signal in the one of the first and second transmission modes; and
an FEC decoder for restoring the transmission data by decoding the demodulated signal.

6. The power line channel-adaptive communications system according to claim 5, wherein the signal receiving end further comprises:
a Zero-Crossing Point (ZCP) detector for acquiring reception synchronization from the signal received from the power line channel;
a synchronization unit for adjusting reception synchronization of the receiving end based on the acquired reception synchronization, and transferring the adjusted reception synchronization to the channel-adaptive controller; and
a channel variation measurer for measuring a state value of the power line channel based on a signal output from the A/D converter, and transferring the measured state value of the power line channel to the channel-adaptive controller.

7. The power line channel-adaptive communications system according to claim 1, wherein:
the first transmission mode is a Robust Mode (RM);
the second transmission mode is a Zero-Crossing Robust Mode (ZERM); and
signals of the first and second transmission modes are expressed using the following Equations (5) and (6), respectively:

$$s_{RM}(t) = \sum_{k=0}^{L-1} \psi_i(t - k \cdot T_S), \quad 0 \le i < N \qquad (5)$$

$$s_{ZERM}(t) = \sum_{k=0}^{L-1} \sum_{l=0}^{M-1} \psi_i\!\left(t - k \cdot T_s - l \cdot \frac{T_{AC}}{2}\right), \quad 0 \le i < N \qquad (6)$$

where $T_{AC}$ is a time interval between zero-crossing points of the AC frequency of a power line, $T_s$ is a chirp signal duration, $\psi_i$ represents the i-th adaptive chirp signal symbol, L is the number of maximum symbols in the first transmission mode, and M is the number of maximum symbols in the second transmission mode.

8. A power line channel-adaptive communications method, comprising the steps of:
generating an adaptive chirp symbol signal of a preset type for transmission data according to a channel state of the power line, modulating the generated adaptive chirp symbol signal in one of first and second transmission modes, and transmitting the modulated adaptive chirp symbol signal via the power line channel;
controlling the type of the adaptive chirp symbol signal; and
receiving the adaptive chirp symbol signal via the power line channel and restoring the transmission data by demodulating the received signal in the one of the first and second transmission modes, wherein the one of the first and second transmission modes is selected according to the channel state of the power line, and wherein transmitting the modulated adaptive chirp symbol signal comprises the steps of:

FEC-encoding the transmission data so that errors of the transmission data can be detected and corrected;

converting the FEC-encode data into parallel data;

generating the adaptive chirp symbol signal of the preset type according to the channel state of the power line based on the parallel data;

modulating the generated adaptive chirp symbol signal of the preset type in the one of the first and second transmission modes according to the channel state of the power line;

converting the modulated signal into an analog signal;

performing bandpass filtering on the analog signal; and amplifying the bandpass-filtered signal, and transmitting the amplified signal via the power line channel through a signal coupler.

9. The power line channel-adaptive communications method according to claim 8, wherein the step of generating the adaptive chirp symbol signal of the preset type comprises the step of generating the extended adaptive chirp symbol signal of the preset type by changing time and frequency characteristics of the extended adaptive chirp symbol signal according to the channel state of the power line.

10. The power line channel-adaptive communications method according to claim 9, wherein a general term of the adaptive chirp symbol signal is expressed using the following Equation (2), $$\psi_i(t) = \sqrt{\frac{2E}{T_S}} e^{2\pi j f_i t} \cdot p(t), \qquad (2)$$

$$p(t) = \begin{cases} 1, & \text{for } 0 \le t \le T_S \\ 0, & \text{otherwise,} \end{cases}$$

$$0 \le i < N$$

where E refers to a symbol energy, and $T_s$ is a chirp signal duration, $f_i$ refers to the frequency value of an i-th adaptive chirp symbol signal, and can be expressed using the following Equation (3):

$$f_i = \begin{cases} f_1 + a_i \frac{f_{BW}}{T_S}(t + i \cdot T_1), & \text{for } 0 \le t < T_S - i \cdot T_1 \\ f_1 + b_i \frac{f_{BW}}{T_S}(t + i \cdot T_1 - T_S), & \text{for } T_S - i \cdot T_1 < t < T_S \\ a_i, b_i = \begin{cases} 1 \\ -1, \end{cases} & \text{for } i = 0, 1, 2, \ldots N - 1 \end{cases} \qquad (3)$$

where i is a number of shifts, $a_i$ and $b_i$ are parameters representing the time and frequency characteristics of an i-th adaptive chirp symbol signal, $f_{BW}$ is a frequency band, and $T_1$ is duration of a minimum unit shift.

11. The power line channel-adaptive communications method according to claim 8, wherein the step of controlling the type and transmission mode of the adaptive chirp symbol signal comprises the steps of providing a signal for controlling the type of the adaptive chirp symbol signal based on a state value of the power line channel, and providing a signal for controlling any one of the first and second transmission modes.

12. The power line channel-adaptive communications method according to claim 8, wherein the step of receiving the adaptive chirp symbol signal comprises the steps of:

pre-filtering the adaptive chirp symbol signal received via the power line channel through a signal coupler;

pre-amplifying the pre-filtered signal;

performing channel filtering on the pre-amplified signal;

converting the channel-filtered signal into a digital signal;

demodulating the digital signal in the one of the first and second transmission modes; and restoring the transmission data by decoding the demodulated signal.

13. The power line channel-adaptive communications method according to claim 12, further comprising the steps of:

acquiring reception synchronization from the signal received from the power line channel;

adjusting reception synchronization of a receiving end based on the acquired reception synchronization, and transferring the adjusted reception synchronization to a transmitting end; and measuring a state value of the power line channel based on the digital signal into which the signal received via the power line channel has been converted, and transferring the measured state value of the power line channel to the transmitting end.

14. The power line channel-adaptive communications method according to claim 13, wherein:

the first transmission mode is a Robust Mode (RM);

the second transmission mode is a Zero-Crossing Robust Mode (ZERM); and the first and second transmission modes are expressed using the following Equations (5) and (6), respectively:

$$s_{RM}(t) = \sum_{k=0}^{L-1} \psi_i(t - k \cdot T_S), \quad 0 \le i < N \qquad (5)$$

$$s_{ZERM}(t) = \sum_{k=0}^{L-1} \sum_{l=0}^{M-1} \psi_i\left(t - k \cdot T_s - l \cdot \frac{T_{AC}}{2}\right), \quad 0 \le i < N \qquad (6)$$

where $T_{AC}$ is a time interval between zero-crossing points of the AC frequency of a power line, $T_s$ is a chirp signal duration, $\psi_i$ represents the i-th adaptive chirp signal symbol, L is the number of maximum symbols in the first transmission mode, and M is the number of maximum symbols in the second transmission mode.

15. A power line channel-adaptive communications system, comprising:

a transmitting end for generating an extended adaptive chirp symbol signal of a preset type for transmission data according to a channel state of the power line, modulating the generated adaptive chirp symbol signal in one of first and second transmission modes, and transmitting the modulated adaptive chirp symbol signal via the power line channel;

a channel-adaptive controller for controlling the type of the adaptive chirp symbol signal; and a receiving end for restoring the transmission data by demodulating the adaptive chirp symbol signal, received via the power line channel, in the one of the first and second transmission modes, wherein the one of the first and second transmission modes is selected by the channel-adaptive controller according to the channel state of the power line, and wherein the receiving end comprises:

a pre-filter for pre-filtering the signal received from the power line channel through a signal coupler;

a pre-amplifier for amplifying the pre-filtered signal;

a channel filter for performing channel filtering on the signal amplified by the pre-amplifier;

an Analog-to-Digital (A/D) converter for converting the channel-filtered signal into a digital signal;

a dual transmission mode signal demodulator for demodulating the digital signal in the one of the first and second transmission modes; and an FEC decoder for restoring the transmission data by decoding the demodulated signal.

\* \* \* \* \*